United States Patent
Doui

(10) Patent No.: US 9,436,423 B2
(45) Date of Patent: Sep. 6, 2016

(54) CLOUD PRINTING SYSTEM PERMITS UNAUTHORIZED USER TO USE MFP WITHOUT EXCEEDING CONSTRAINTS SET FOR CORRELATED QUEST ACCOUNT

(71) Applicant: KONICA MINOLTA, INC., Chiyoda-ku (JP)

(72) Inventor: Takayuki Doui, Mitaka (JP)

(73) Assignee: KONICA MINOLTA, INC., Chiyoda-Ku Tokyo (JP)

( * ) Notice: Subject to any disclaimer, the term of this patent is extended or adjusted under 35 U.S.C. 154(b) by 101 days.

(21) Appl. No.: 14/300,357

(22) Filed: Jun. 10, 2014

(65) Prior Publication Data
US 2014/0372514 A1    Dec. 18, 2014

(30) Foreign Application Priority Data

Jun. 13, 2013  (JP) .................................. 2013-125047

(51) Int. Cl.
*G06F 3/12* (2006.01)
*G06F 21/60* (2013.01)

(52) U.S. Cl.
CPC ........... *G06F 3/1288* (2013.01); *G06F 3/1212* (2013.01); *G06F 3/1222* (2013.01); *G06F 3/1236* (2013.01); *G06F 3/1237* (2013.01); *G06F 3/1238* (2013.01); *G06F 3/1239* (2013.01); *G06F 3/1287* (2013.01); *G06F 21/608* (2013.01)

(58) Field of Classification Search
CPC .. G06F 21/608; G06F 3/1203; G06F 3/1205; G06F 3/1222; G06F 3/1255; G06F 3/1287; G06F 3/1236; G06F 3/1288; G06F 3/1237; G06F 3/1238; G06F 3/1239; G06Q 10/06; G07F 17/42; H04L 63/08; H04N 1/32128
See application file for complete search history.

(56) References Cited

U.S. PATENT DOCUMENTS

2005/0223011 A1* 10/2005 Horiyama .............. G06Q 10/06
2006/0001897 A1*  1/2006 Ogasawara ........ H04N 1/32128
                                                              358/1.13
2007/0296995 A1* 12/2007 Sakura .................. G06F 3/1205
                                                              358/1.13

(Continued)

FOREIGN PATENT DOCUMENTS

EP         2 600 591 A1    6/2013
JP         10-187370 A     7/1998

(Continued)

OTHER PUBLICATIONS

Google Cloud Print (Google—Cloud Print searched over the Internet on Feb. 26, 2013, URL:http://www.google.co.jp/cloudprint/learn/).

(Continued)

*Primary Examiner* — Le H Luu
(74) *Attorney, Agent, or Firm* — Buchanan Ingersoll & Rooney PC

(57) ABSTRACT

A cloud server includes a constraint setting portion configured to set at least one authorized account with which login operation is allowed and with which use of the information device is allowed, and to set constraints in use of the information device for each authorized account; and a use restriction portion configured to permit a user who has performed login operation with the authorized account to use the information device without exceeding constraints set for the authorized account.

16 Claims, 15 Drawing Sheets

(56) References Cited

U.S. PATENT DOCUMENTS

| | | | |
|---|---|---|---|
| 2008/0204796 A1* | 8/2008 | Kitamura | G06F 21/608 358/1.15 |
| 2008/0244708 A1* | 10/2008 | Wilkie | H04L 63/08 726/4 |
| 2009/0180140 A1* | 7/2009 | Kawamura | G06F 3/1205 358/1.15 |
| 2010/0245884 A1* | 9/2010 | Komine | G06F 3/1255 358/1.15 |
| 2011/0063660 A1* | 3/2011 | Yamada | G06F 3/1203 358/1.15 |
| 2011/0116131 A1* | 5/2011 | Mitsui | G06F 3/1205 358/1.15 |
| 2011/0179284 A1 | 7/2011 | Suzuki et al. | |
| 2011/0218892 A1 | 9/2011 | Jeong et al. | |
| 2012/0229838 A1 | 9/2012 | Mogaki | |
| 2012/0300246 A1* | 11/2012 | Vidal | G07F 17/42 358/1.14 |
| 2013/0135675 A1 | 5/2013 | Hashimoto | |
| 2013/0293924 A1* | 11/2013 | Armstrong | G06F 3/1205 358/1.15 |
| 2014/0372514 A1* | 12/2014 | Doui | G06F 3/1222 709/203 |

FOREIGN PATENT DOCUMENTS

| | | |
|---|---|---|
| JP | 2008-040564 A | 2/2008 |
| JP | 2010-257443 A | 11/2010 |
| JP | 2012-190074 A | 10/2012 |
| WO | 2008/041286 A1 | 4/2008 |

OTHER PUBLICATIONS

Office Action (Notification of Reasons for Refusal) issued on Apr. 14, 2015, by the Japanese Patent Office in corresponding Japanese Patent Application No. 2013-125047, and an English Translation of the Office Action. (6 pages).

Extended European Search Report dated Aug. 8, 2014, issued by the European Patent Office in the corresponding European Application No. 14171926.0. (5 pages).

* cited by examiner

FIG. 4

| T11 | ACCOUNT MANAGEMENT | | | | |
|---|---|---|---|---|---|
| ID | COMPANY NAME (54) | USER NAME (ACCOUNT ID) (55) | PASSWORD (56) | E-MAIL ADDRESS (57) | CORRELATED GUEST ACCOUNT NAME (58) |
| 001 | A-COMPANY | User-A1 | xxxxxxxx | xxx@xxx.xxx | |
| 002 | A-COMPANY | User-A2 | xxxxxxxx | xxx@xxx.xxx | GUEST ACCOUNT (A) |
| 003 | A-COMPANY | User-A3 | xxxxxxxx | xxx@xxx.xxx | |
| 004 | A-COMPANY | User-A4 | xxxxxxxx | xxx@xxx.xxx | |
| ... | ... | ... | ... | ... | |
| 145 | B-COMPANY | User-B1 | xxxxxxxx | xxx@xxx.xxx | |
| 146 | B-COMPANY | User-B2 | xxxxxxxx | xxx@xxx.xxx | |
| 147 | B-COMPANY | User-B3 | xxxxxxxx | xxx@xxx.xxx | |
| ... | ... | ... | ... | ... | |
| 520 | C-COMPANY | User-C1 | xxxxxxxx | xxx@xxx.xxx | |
| 520 | C-COMPANY | User-C2 | xxxxxxxx | xxx@xxx.xxx | |
| ... | ... | ... | ... | ... | |

FIG. 5

| T12 | 61 | 62 |
|---|---|---|
| GUEST ACCOUNT MANAGEMENT | | |
| ID | GUEST ACCOUNT NAME | PASSWORD |
| 001 | GUEST ACCOUNT (A) | xxxxxxxx |
| ⋮ | ⋮ | ⋮ |

FIG. 6

| CONSTRAINT LIST T20 / 71 | 72 |
|---|---|
| SET ITEMS | CONSTRAINT CONDITIONS |
| EFFECTIVE PERIOD | ONLY ONCE/1 DAY ONLY/DESIGNATED PERIOD ONLY/DESIGNATED TIME ONLY/··· |
| NUMBER OF TIMES OF PRINTING | ONLY ONCE/3 DAYS ONLY/NONE SPECIFIED/··· |
| NUMBER OF PRINTS | 1 SHEET ONLY/UP TO 10 SHEETS ONLY/NONE SPECIFIED/··· |
| PRINT COLOR | FULL-COLOR PRINTING AVAILABLE/ONLY MONOCHROME PRINTING/TWO-COLOR PRINTING AVAILABLE/··· |
| FEE | JP¥100/NONE SPECIFIED/··· |
| DOCUMENT | TEXT ONLY/IMAGE AVAILABLE/*.docx ONLY/*.pptx ONLY/··· |
| RESTRICTION | UNAVAILABLE FOR DOCUMENT CONTAINING CHARACTER STRING OF "CONFIDENTIAL", "CLASSIFIED" ··· |
| N-IN-1 | 1-IN-1 AVAILABLE/2-IN-1 OR SMALLER ONLY/4-IN-1 OR SMALLER ONLY/··· |
| DOUBLE-SIDED | SINGLE SIDED AVAILABLE/DOUBLE-SIDED ONLY/··· |
| ··· | ··· |
| TRANSMISSION METHOD | E-MAIL AVAILABLE/FAX ONLY/··· |
| TRANSMISSION DESTINATION | REGISTERED DESTINATION ONLY/NO LIMITATION/··· |
| SAVE BOX | GUEST BOX ONLY/ARBITRARILY SPECIFIED/··· |
| ··· | ··· |

FIG. 7

| MFP MANAGEMENT T30 | | | | | |
|---|---|---|---|---|---|
| ID | COMPANY NAME 81 | MFP NAME 82 | IP ADDRESS 83 | ADMINISTRATOR NAME 84 | AUTHORIZED USER: RESTRICTION INFORMATION 85 | REGISTERED JOB 86 |
| 001 | A-COMPANY | MFP-A1 | xxx.xxx.xxx.xx1 | User-A1 | User-A1: ALL<br>User-A2: xxx,xxx,···<br>User-A3: xxx,xxx,···<br>User-A4: xx,xxxxxx,xx,···<br>··· | |
| 002 | B-COMPANY | MFP-B1 | xxx.xxx.xxx.xx1 | User-B1 | User-B1: ALL<br>User-B2: ALL<br>···<br>GUEST ACCOUNT(A): Print_1 COPY ONLY<br>User-A4: Print_1 COPY ONLY | GUEST ACCOUNT(A): test.docx |
| 003 | B-COMPANY | MFP-B2 | xxx.xxx.xxx.xx2 | User-B2 | User-B1: ALL<br>User-B2: ALL<br>User-B3: xxxx,xxxxx,···<br>··· | |
| 004 | C-COMPANY | MFP-C1 | xxx.xxx.xxx.x10 | User-C1 | User-C1: ALL<br>User-C2: xx,xx,xxxx<br>··· | |
| ··· | ··· | ··· | ··· | ··· | ··· | |

CLOUD PRINTING SYSTEM PERMITS UNAUTHORIZED USER TO USE MFP WITHOUT EXCEEDING CONSTRAINTS SET FOR CORRELATED QUEST ACCOUNT

This application is based on Japanese patent application No. 2013-125047 filed on Jun. 13, 2013, the contents of which are hereby incorporated by reference.

BACKGROUND OF THE INVENTION

1. Field of the Invention

The present invention relates to cloud computing.

2. Description of the Related Art

A variety of cloud services such as an online storage is provided on the Internet. In connection with the widespread use of mobile information devices (hereinafter referred to as mobile terminals) such as a tablet PC and a smartphone, the convenience of the cloud services is improved. In recent years, more companies have used such cloud services for business.

Google Cloud Print (registered trademark) is known as a cloud service related to document printing (Google Cloud Print searched over the Internet on Feb. 26, 2013, URL: http://www.google.co.jp/cloudprint/learn/). The cloud service allows a user to use any terminal connected to the Internet to cause a printer registered in advance on the Internet by the user to perform printing promptly. For example, such a cloud service is used to cause a printer placed in office/home to print a document created somewhere away from office/home. A user A of the cloud service registers an e-mail address of another user B, so that the user A can share a printer with the user B.

Meanwhile, concerning network printing in a local network, a technology has been proposed for enabling network printing between networks separated from each other by a firewall. According to a network printer system disclosed in Japanese Laid-open Patent Publication No. 10-187370, a terminal making a print request converts print data received from an application into an e-mail message format, and sends the e-mail message to a printer with a Simple Mail Transfer Protocol (SMTP). The printer has a mail server function, obtains print data from a received e-mail message, and performs printing.

A method has been used in which, in order to enable a visiting employee to use an office device placed in a business destination even if he/she is not given an account for the device, a temporary account effective tentatively is issued. According to an image forming apparatus disclosed in Japanese Laid-open Patent Publication No. 2008-040564, a user is allowed to register a substitute account effective tentatively for a substitute person who uses the image forming apparatus instead of the user himself/herself. The substitute person logs into the image forming apparatus with the substitute account to use the image forming apparatus.

In the meantime, the following situation occurs often: An information device (A-device) used by an A-user of a cloud service can gain access to a cloud server on the Internet; however is not allowed to gain access to another information device (B-device) on a local network connected to the Internet. Under such a situation, the A-user cannot cause the B-device to which access cannot be gained to perform cooperative operation with the cloud server.

Suppose that, for example, an A-employee working at an A-branch of an X-company carries a mobile terminal (A-terminal) and goes on a business trip to a B-branch, and access from the A-terminal of the A-employee to a Local Area Network (LAN) of the B-branch is denied due to security. In such a situation, the A-employee cannot use a B-printer connected to the LAN of the B-branch to print a document saved in his/her A-terminal or in a cloud server. To be specific, even if the A-employee wishes to print a document at the destination because the document has many pages or the document is strictly confidential, the A-employee is not allowed to do so.

To cope with this, it is possible to make settings for sharing the printer B between an employee B of the B-branch and the employee A of the A-branch as with the foregoing Google Cloud Print. This, however, makes it possible for the employee A to use the printer B only in the same way as the employee B does during a period of time in which the settings for sharing the printer B are made. Stated differently, if settings for the employee B do not limit printing conditions such as the number of prints or paper size, the employee A is allowed to use the printer B without limitation.

If settings are made to share a Multi-functional Peripheral (MFP) rather than the printer B between the employee B of the B-branch and the employee A of the A-branch, security problems occur. The MFP is a composite information device which is used as a copier, printer, scanner, facsimile machine, and storage. The MFP is also equipped with functions of printing a document saved in a memory area called a box, and sending such a document to an external device. In light of information security, shared settings are not preferable in which the employee A of the A-branch is allowed to gain access freely to documents of a box of the MFP placed in the B-branch.

SUMMARY

The present disclosure has been achieved in light of such an issue, and therefore, an object of an embodiment of the present invention is to provide a cloud service which can place constraints on an information device connected to a network to which an account owner is not allowed to gain access in order to cause the information device to execute a job.

According to one aspect of the present invention, a cloud server for a cloud service includes a target setting portion configured to set an information device designated to a target device use of which is restricted; a constraint setting portion configured to set, as at least one authorized account with which login operation is allowed and with which use of the information device is allowed, either one or both of a guest account for the information device and any one of user accounts identifying users already registered in the cloud server depending on settings entered, and to set constraints in use of the information device for each authorized account; and a use restriction portion configured to permit a user who has logged into the cloud server with the authorized account to use the information device without exceeding constraints set for the authorized account.

These and other characteristics and objects of the present invention will become more apparent by the following descriptions of preferred embodiments with reference to drawings.

BRIEF DESCRIPTION OF THE DRAWINGS

FIG. 4 is a diagram showing an example of an account management table in a cloud.

FIG. 5 is a diagram showing an example of a guest account management table in a cloud.

FIG. 6 is a diagram showing an example of a constraint list table in a cloud.

FIG. 7 is a diagram showing an example of an MFP management table in a cloud.

DESCRIPTION OF THE PREFERRED EMBODIMENTS

In this description, a cloud print service for an information device having a print function is taken as an example of a cloud service which enhances the usage of an information device connected to a network.

Figure 1:
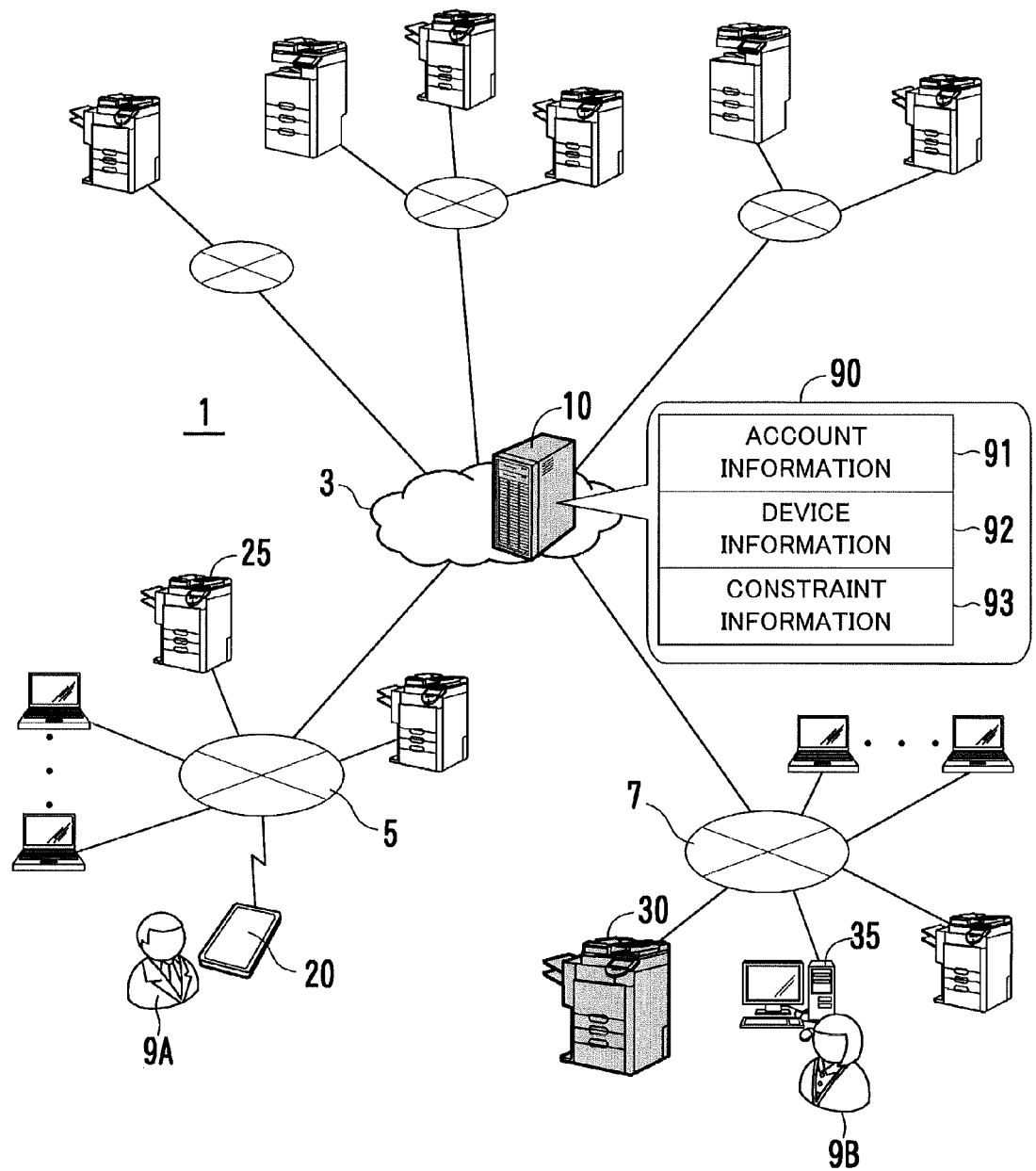
FIG. 1 is a diagram showing an example of the outline of a configuration of a cloud print system according to an embodiment of the present invention.

Referring to FIG. 1, a cloud print system 1 is configured of a cloud server 10 provided in a cloud 3 including the Internet, and an MFP 30 provided in a network 7 connected to the cloud 3. The MFP 30 is a composite information device used as a network printer. In addition to the network 7, a network 5 and other networks are connected to the cloud 3. Each of the networks has at least one MFP. Instead of the MFP, each of the networks may be provided with another information device having a print function, e.g., a printer, a copier, and a facsimile machine.

The network 5 and the network 7 are provided separately from each other. Direct access between the networks 5 and 7 is denied by firewalls of the networks 5 and 7. An example of such a case is a case where the network 5 is a LAN of an A-company, and the network 7 is a LAN of a B-company. The case is not limited to the case where the networks are provided in different companies. Even when the networks are provided in the same company, firewalls sometimes separate the networks in different divisions or locations (different floors of a building, office and factory, or head office and branch).

In the network 5, personal computers (hereinafter, referred to as PCs) including a tablet 20 can gain access to an MFP 25 on the network 5 and the cloud 3. Stated differently, a user 9A of the tablet 20 can make the MFP 25 print a document stored in the tablet 20 or the cloud 3. However, the user 9A cannot make the MFP 30 in the network 7 print a document without the use of a cloud service provided by the cloud print system 1. In other words, the cloud print system 1 enables the user 9A to use the MFP 30 to print a document stored in the tablet 20 or the cloud 3.

The cloud server 10 manages registration information 90 related to the cloud print service. The registration information 90 contains account information 91 indicating an account of a user of the cloud print service, device information 92 for identifying an information device which is permitted to be used, and constraint information 93 indicating constraints placed on the use of an information device. The registration information 90 is updated every time when an account is issued to a new user, or when a user already given an account registers an information device and constraints.

A user who is authorized to gain access to the network 7 having the MFP 30 registers the MFP 30 into the cloud server 10. In this embodiment, a user 9B who is an administrator of the MFP 30 performs the registration operation. The user 9B uses a PC 35 to obtain access to the cloud server 10, and enters an IP address and other predetermined information, so that the MFP 30 is registered into the cloud server 10. The user 9B also sets a user who is to be authorized to use the MFP 30, and constraints in use placed on each user authorized to use the MFP 30.

In the case where the user 9A of the network 5 is registered as a user authorized to use the MFP 30, the user 9A can use the MFP 30 without exceeding the set constraints. Suppose that, for example, the user 9A is an employee of the A-company and the MFP 30 is placed in an office of the B-company. Even under the situation, when the user 9A visits the B-company, he/she is allowed to print out a material at the B-company, and to send to the A-company a document obtained at the B-company. In such a case, the user 9A (visitor) can benefit from the cloud print system 1 of this embodiment, i.e., can "obtain a print environment usable at a destination place". On the other hand, the B-company can benefit from the cloud print system 1 of this embodiment, i.e., can "create a network environment convenient to a visitor, and at the same time, prevent the improper use beyond the constraints".

Figure 2:
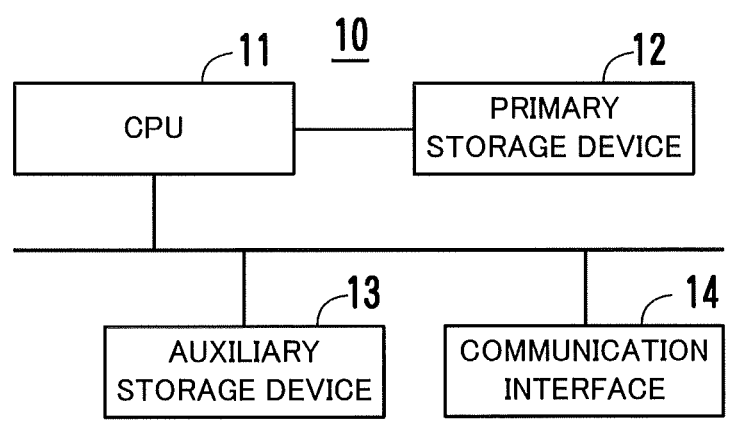
FIG. 2 is a diagram showing an example of the hardware configuration of a cloud server.

As shown in FIG. 2, the hardware configuration of the cloud server 10 is similar to that of a typical information processing device. The cloud server 10 is configured of a Central Processing Unit (CPU) 11 functioning as a computer to execute a program, a primary storage device 12 to which the CPU 11 gains direct access, an auxiliary storage device 13 with a large storage capacity, a communication interface 14 for performing communication with an external device, and so on.

Figure 3:
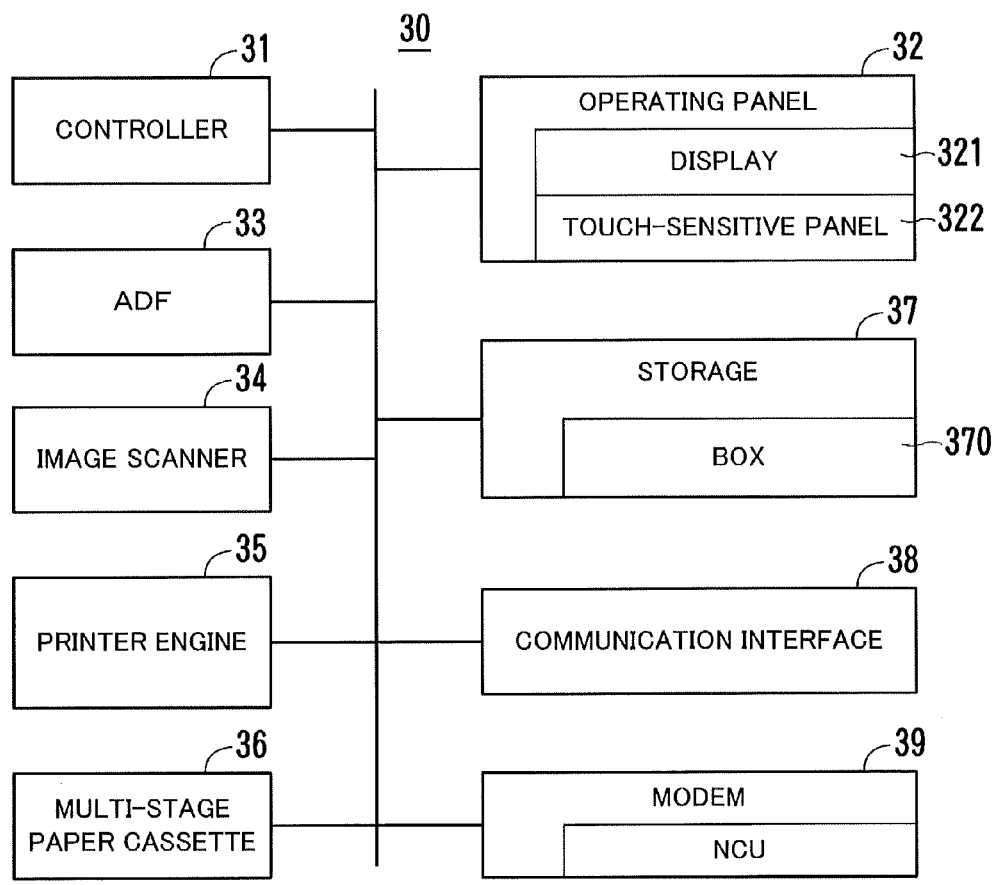
FIG. 3 is a diagram showing an example of the hardware configuration of an MFP the use of which is restricted.

Referring to FIG. 3, the MFP 30 is configured of an Auto Document Feeder (ADF) 33, an image scanner 34, a printer engine 35, a storage 37, a communication interface 38, a modem 39, and so on. This enables the MFP 30 to be used as a copier, printer, network scanner, facsimile machine, document server, and so on.

In the case of copying, image input, or facsimile transmission, the ADF 33 feeds a document sheet to a scan position of the image scanner 34. The image scanner 34 optically reads image information recorded on the document sheet. The printer engine 35 is operable to print, through electrophotography, a monochrome or color image onto a single side or both sides of paper supplied from a multi-stage paper cassette 36.

The storage 37 is a hard disk drive (HDD) or another mass storage device. The storage 37 is used as a medium for storing programs and data for control. The storage 37 has a box 370 for saving document data thereto.

The communication interface 38 connects the MFP 30 to the network 7. The modem 39 is provided with a Network Control Unit (NCU), and is used for facsimile communication through a public telephone line.

The MFP 30 operates in accordance with direct operation on an operating panel 32 and access from an external information device connected to the MFP 30 via the network 7. The MFP 30 serves to print a scan image captured from a document sheet, save the scan image into the box 370, and sends the scan image to an external device. The MFP 30 also serves to receive a document from an external device or read out a document from the box 370 to print out the document. A controller 31 for controlling such operation by the MFP 30 is provided with a non-illustrated CPU to execute a control program. The operating panel 32 is provided with a display 321 and a touch-sensitive panel 322.

FIG. 4 shows an example of data items for an account management table T11 in order for the cloud server 10 to manage the account information 91. The account management table T11 has data items 54, 55, 56, 57, and 58 named "company name", "user name", "password", "e-mail address", and "correlated guest account name", respectively. The "user name" corresponds to an account ID of a "user account" which is issued to a user of a service provided by the cloud server 10. A user given to a user account is allowed to log into the cloud server 10 by entering his/her user name and password.

A method for entering authentication information for user authentication is not limited to entering a character string such as an ID and a password with a keyboard, and may be entering authentication information by reading out the same from an IC card or another medium. As a user authentication method, another method such as biometric identity verification may be used.

The data item 58 of "correlated guest account name" in the account management table T11 is provided in order to indicate, in the case where a "guest account" is correlated with a user account, a guest account name of the guest account. The "guest account" is an account, except for existing user accounts, among "authorized accounts" (described later) set by a user who registered an information device which is permitted to be used. When a user who has logged into the cloud server 10 with a guest account enters a user name (account ID), or, alternatively, when a user who has logged into the cloud server 10 with a user account enters a guest account name, the guest account and the user account are correlated with each other. In the example of FIG. 4, a guest account having an account name of "guest account (A)" is correlated with a user account having a user name of "User-A3".

FIG. 5 shows an example of a guest account management table T12 for user authentication for the case of login operation with a guest account. The guest account management table T12 has data items 61 and 62 named "guest account name" and "password", respectively.

FIG. 6 is a diagram showing an example of a constraint list table T20. The constraint list table T20 has data items 71 and 72 named "set items" and "constraint conditions", respectively. In the constraint list table T20, choices are provided for constraint conditions that determine constraints in use and can be set for an information device (MFP) in the cloud print system 1. The examples of choices are as follows. For the effective period of a guest account, prepared choices are: only once; only one day; only a designated period; only a designated time; and so on. As the constraint conditions for printing, set items are prepared for number of times, number of prints, print color, and fee for fee-based service, and so on. For each of these set items, choices are prepared. Further, there are provided constraint conditions for limiting the type of a document to be printed, prohibiting a document containing a specific character string from being printed. There are also provided constraint conditions for limiting the printing to N-in-1 printing or double-sided printing for paper saving. For transmission/save of a scan image, constraint conditions are prepared for designating resolution or color for read out. Further, constraint conditions are prepared for limiting a transmission method or a transmission destination.

FIG. 7 shows an example of an MFP management table T30. The MFP management table T30 is provided in order to manage the device information 92 and the constraint information 93. In the MFP management table T30, the information devices the use of which is restricted are associated with constraints in use by each user set for the information devices. The MFP management table T30 has data items 81, 82, 83, 84, 85, and 86 named "company name", "MFP name", "IP address", "administrator name", "authorized user: restriction information", and "registered job", respectively.

Referring to FIG. 7, a user having a name of "User-A1" is registered as an administrator of an information device having a name of "MFP-A1" owned by the "A-company". The data item 85 of "authorized user: restriction information" indicates data "User-A1:ALL". This means that the administrator (User-A1) is set as a person who is authorized to use the information device (MFP-A1), and is not given any constraints for the use of the information device, i.e., is permitted to use all the functions thereof.

In the example of FIG. 7, a user who logs into an information device having a name of "MFP-B1" owned by the "B-company" with a guest account having a name of "guest account (A)" is set as a person who is authorized to use the information device. Further, constraints for limiting printing to only 1 copy printing are set for the user. Further, the data item 86 of "registered job" indicates data "guest account (A): test.docx". This means that the user who logged into the information device with the guest account already registers a job named "test.docx".

Figure 8:
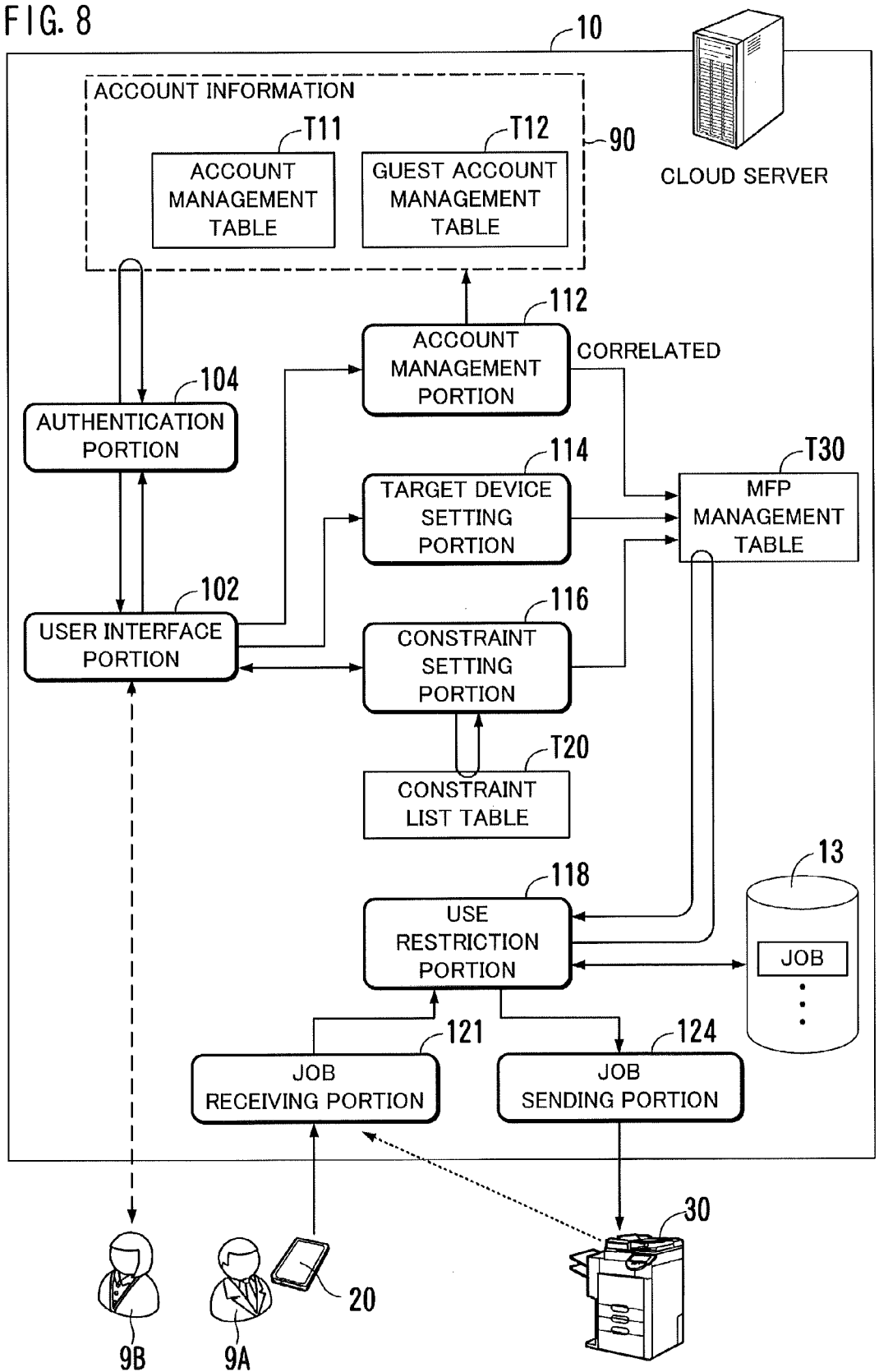
FIG. 8 is a diagram showing an example of the functional configuration of a cloud server.

FIG. 8 shows an example of the functional configuration of the cloud server 10.

The cloud server 10 is configured of a user interface portion 102, an authentication portion 104, an account management portion 112, a target device setting portion 114, a constraint setting portion 116, a use restriction portion 118, a job receiving portion 121, a job sending portion 124, and so on. These portions are functional elements implemented in response to execution of a program, by the CPU 11, loaded from the auxiliary storage device 13.

The user interface portion 102 responds to access from a user via network communication. The user interface portion 102 sends data on a login screen to an information device (MFP in this example) operated by the user, and conveys data on account ID and password entered by the user to the authentication portion 104. The authentication portion 104 verifies the entered information against the account information 90. If the authentication portion 104 permits the user to log into the cloud server 10, then the user interface portion 102 causes the display 321 to display a screen appropriately in accordance with the input operation by the user, and conveys a command given by the logged-in user to a functional portion which is to perform processing in response to the command.

Suppose that the user 9B who is an administrator of the MFP 30 performs registration operation related to the MFP 30.

When the user 9B enters, on an entry screen, information for identifying the MFP 30, namely, an IP address or an MFP name, the target device setting portion 114 writes the entered information into the MFP management table T30. Thereby, the MFP 30 is registered as a target device the use of which is restricted.

After the MFP 30 is registered, the user 9B designates an "authorized user" to whom permission to use the MFP 30 is given. If the authorized user to be designated is a known user, then the user 9B enters a user account of the known user as an "authorized account". If the authorized user to be designated is a guest whose user account is not known, then the user 9B enters a guest account determined appropriately as the "authorized account". A plurality of authorized accounts may be entered, and both a known user and a guest may be designated as the authorized user. The administrator usually designates himself/herself as the authorized user.

The account management portion 112 writes the authorized account thus entered into the MFP management table T30. When the user 9B sets a guest account, the account management portion 112 writes the entered guest account name and the entered password into the guest account management table T12. Thereby, preparations are made for login operation with the user account or the guest account to be approved.

When the user 9B sets constraints in use of the MFP 30 for the authorized user, the constraint setting portion 116 writes constraint conditions into the MFP management table T30. The constraint setting portion 116 works in coordination with the user interface portion 102 to present, to the user 9B, choices for constraint conditions indicated in the constraint list table T20 by showing a predetermined screen to the user 9B. The user 9B makes desired settings by performing operation on a screen displayed in the information device operated by the user 9B.

When the MFP 30, the authorized users, and the constraints in use for each authorized user are registered in the foregoing manner, each of the authorized users is permitted to use the MFP 30 without exceeding the constraints set for himself/herself. For example, when the user 9A operates the tablet 20 to give a job to be executed by the MFP 30, the job receiving portion 121 conveys the job received from the tablet 20 to the use restriction portion 118. The use restriction portion 118 determines whether or not the job satisfies the constraints with reference to the MFP management table T30. If it is determined that the job satisfies the constraints, then the job sending portion 124 transfers the job to the MFP 30 in which the job is executed.

If a pull print job satisfying the constraints is given, the use restriction portion 118 saves the pull print job to the auxiliary storage device 13, and writes a job name of the pull print job into the MFP management table T30 as data for the data item 86 (registered job). After that, in response to a transfer request from the MFP 30, the use restriction portion 118 and the job sending portion 124 transfer the pull print job to the MFP 30.

In another case, a job is directly given to the MFP 30. A job involving scanning of optically reading an image from a document sheet is basically given through direct operation on the operating panel 32 of the MFP 30. Jobs involving scanning are: a transfer job of transferring document data to the cloud 3 or an information device in the network 7; a facsimile transmission job; a copy job; a job of saving data to the box 370; and so on. When a job is directly given to the MFP 30, the MFP 30 informs the use restriction portion 118 of set contents of the job through the job receiving portion 121. The use restriction portion 118 determines whether or not the informed job satisfies constraints. Only when determining that the informed job satisfies the constraints, the use restriction portion 118 gives the MFP 30 permission to execute the job. The permission is conveyed to the MFP 30 through the job sending portion 124.

Hereinafter, the operation by the cloud server 10 is detailed with reference to the flowcharts.

Figure 9:
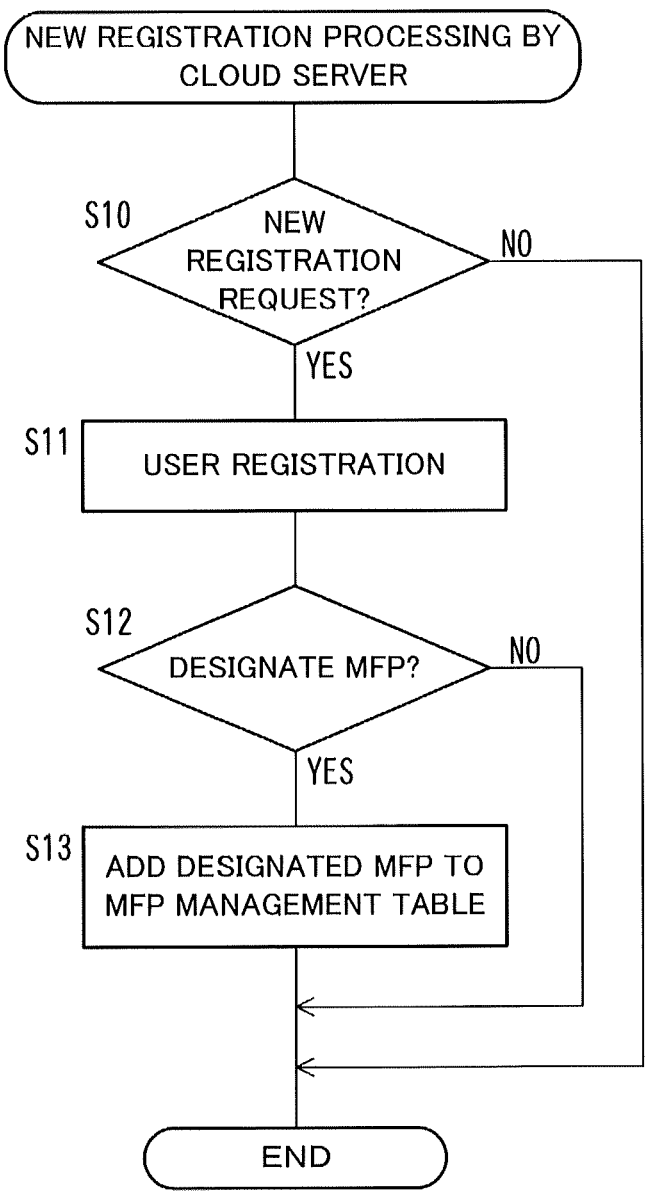
FIG. 9 is a flowchart depicting an example of new registration processing by a cloud server.

FIG. 9 is a flowchart depicting an example of new registration processing by the cloud server 10. When the user interface portion 102 receives a new registration request from an accessed person (Yes in S10), the account management portion 112 performs user registration processing (S11). In the user registration processing, user information (user name, password, and so on) entered by the accessed person is written into the account management table T11. Thereby, a user account is issued to the accessed person.

In this example, the newly-registered user is permitted to perform a registration operation for target device after the user registration operation is performed. For example, the user 9B who is an administrator authorized to designate the MFP 30 operates the PC 35 to gain access to the cloud server 10 to obtain a user account. Thereafter, if the user 9B intends to designate the MFP 30 (Yes in Step S12), then he/she performs predetermined operation to display an MFP entry screen. When device information (MFP name, IP, address, and so on) of the MFP 30 is entered into the MFP entry screen, the target device setting portion 114 writes the device information on the MFP 30 into the MFP management table T30 (Step S13).

Figure 10:
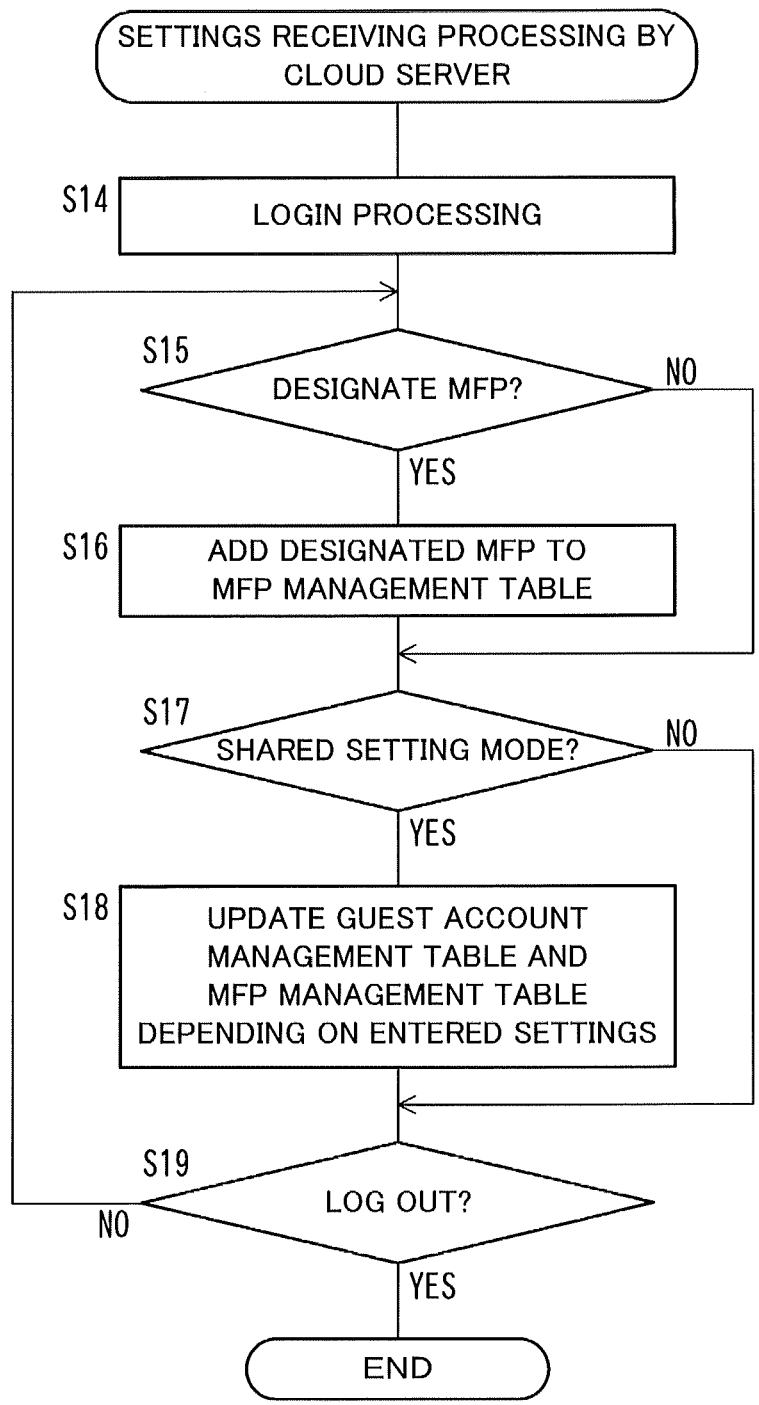
FIG. 10 is a flowchart depicting an example of settings receiving processing by a cloud server.

FIG. 10 is a flowchart depicting an example of settings receiving processing by the cloud server 10.

The authentication portion 104 performs login processing for verifying the identity of a user based on the account information 90 (Step S14). The verified user performs the predetermined operation for displaying the MFP entry screen (Yes in Step S15) to enter device information thereinto. In response to the entry, the target device setting portion 114 writes the device information into the MFP management table T30 (Step S16). Stated differently, an information device identified by the device information, e.g., the MFP 30, is registered as a target device the use of which is restricted.

In the case where the information device is registered in the access to the cloud server 10 this time, or, in the previous access to the MFP 30, the logged-in user can set a "shared setting mode". The shared setting mode is an input mode in which one or more authorized users and constraints in use are set for the registered information device. If the shared setting mode is designated (Yes in Step S17), then the account management portion 112 and the constraint setting portion 116 update the guest account management table T12 and the MFP management table T30 depending on settings entered by the logged-in user (Step S18). If the user logs out of the cloud server 10 (Yes in Step S19), then the settings receiving processing is finished.

Figure 11:
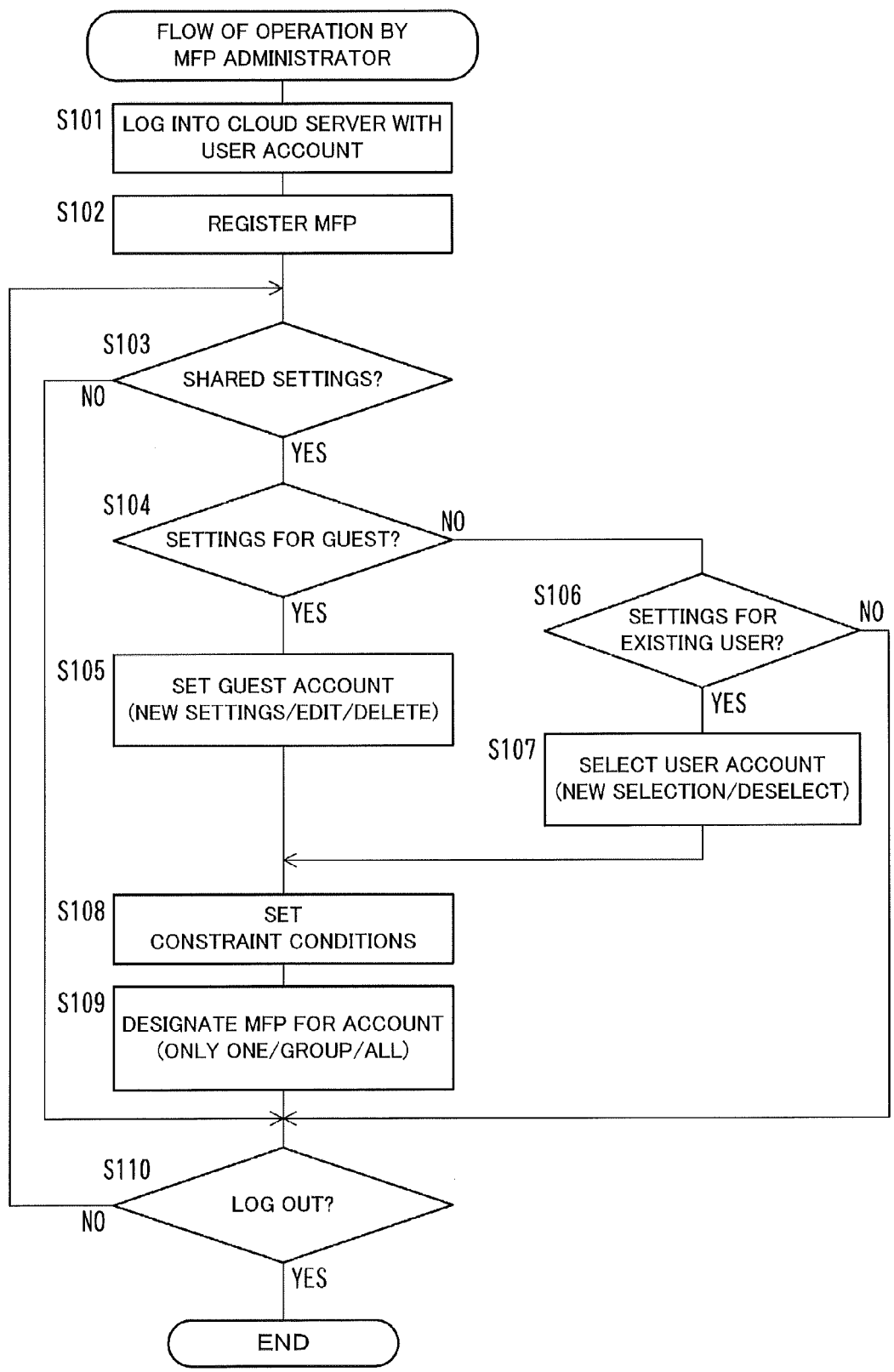
FIG. 11 is a flowchart depicting an example of the flow of operation performed by an MFP administrator.

FIG. 11 is a flowchart depicting an example of the flow of operation performed by an MFP administrator. The administrator herein is a user authorized to perform registration operation on the MFP among users having user accounts. The administrator may be an owner of the MFP if the MFP is personally owned.

Administrators of MFPs, including the MFP 30, which are connected to the cloud server 10 for communication log into the cloud server 10 with the individual user accounts (Step S101). The user accounts used for this time may be an account obtained for management, and be an account obtained as an ordinary user.

The logged-in administrator registers one ore more MFPs managed by himself/herself as a target device the use of which is restricted in the cloud print service (step S102). If the target device is already registered at the time of new registration for obtaining the user account, registering the MFPs at this time may be omitted.

The administrator determines whether or not to make shared settings for designating one or more authorized users (Step S103). If a guest is designated as the authorized user (Yes in Step S104), then the administrator sets a guest account (Step S105). A plurality of guest accounts can be set and adding/deleting a guest account can be made. If a new guest account is set, then the administrator enters a guest account name and a password to be entered by the guest. It is possible to change the guest account name or password that is previously set for the guest account. It is also possible that, at a time when the MFP is used or when login to the MFP is made with the guest account, a status notice mail is sent to the administrator. Settings are possible in which a history of the use of the guest account is recorded.

If an existing user is set as the authorized user (Yes in Step S106), then the administrator selects a user from among a user list displayed based on screen data from the cloud server 10 (Step S107). A user account of the selected user is used as an authorized account for identifying the authorized user. The user selection is made by the following methods: individual selection; collective selection of selecting all the users of one company or one group; and collective selection of selecting all the users whose account IDs include a specific character string. Deselecting a user who was previously selected is possible. Settings are possible in which a statue notice mail is sent and a history of the use is recorded.

The user list displayed to make such settings of the authorized user shows only users of the organization to which the administrator belongs. For example, in a case where organizations are distinguished on a company basis, the administrator of the B-company is given a list of users belonging to the B-company, and is not allowed to select a user belonging to companies (including the A-company) other than the B-company.

The administrator then sets, for the authorized user, constraints in use of a registered MFP (Step S108). When there are authorized users including the administrator himself/herself, the administrator can set constraints different for each authorized user. The administrator sets constraints by appropriately combining choices for the constraint conditions listed in the constraint list table T20. It is possible to designate whether or not to inform the administrator of the state of constraints setting management (described later) performed automatically by the cloud server 10.

The administrator designates an MFP that the authorized user is permitted to use (Step S109). Instead of designating only one MFP, the administrator may designate a plurality of MFPs for each of the authorized users. For example, the administrator may designate MFPs belonging to one of groups classified based on the installation location or the functions, or, all the MFPs under the management of the administrator. After that, the administrator logs out of the cloud server 10 and finishes the settings (Step S110).

As described above, a plurality of MFPs is allocated to each of the authorized users as devices that he/she is permitted to use. Thereby, even if an MFP that the authorized user A intends to use is under maintenance or is used by another authorized user B, the authorized user A can use another MFP promptly. This eliminates the need for the administrator to allocate another MFP to the authorized user A every time when the authorized user A cannot use the desired MFP promptly.

Figure 12:
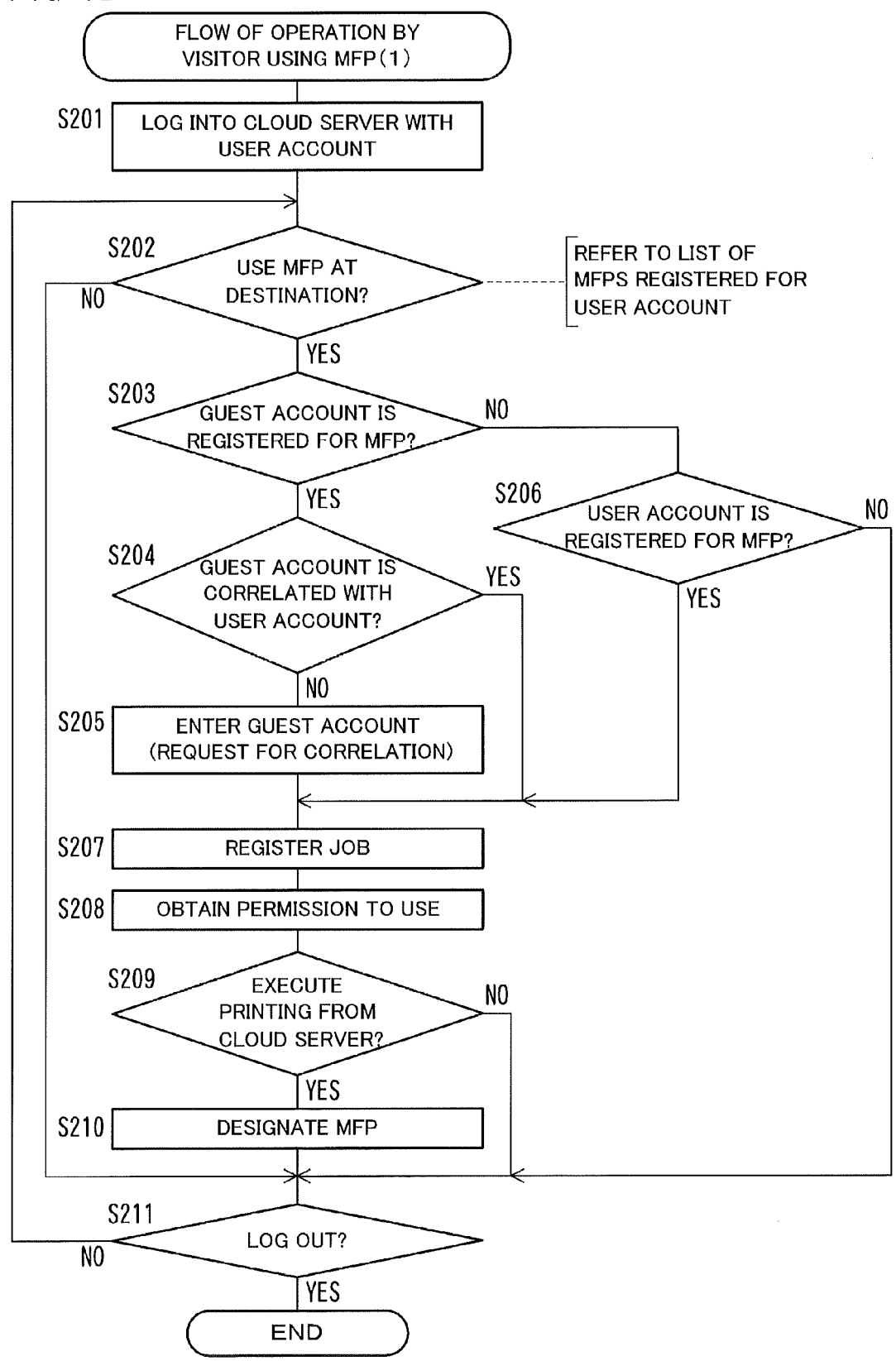
FIG. 12 is a flowchart depicting a first flow of operation performed by a visitor using an MFP.

FIG. 12 is a flowchart depicting a first flow of operation performed by a visitor who uses an MFP. It is supposed that the user 9A shown in FIG. 1 intends to use the MFP 30 on the network 7. The user 9A goes to the installation location of the MFP 30 (hereinafter referred to as a destination). The user 9A directly operates the MFP 30 to cause the MFP 30 to perform printing or scanning, or, to obtain a printed matter which is produced by the MFP 30 to which the user 9A gives a print command in advance.

The user 9A logs into the cloud server 10 with his/her user account (Step S201). The login operation may be made before or after the user 9A goes off to the destination. As long as the tablet 20 used for the login operation is accessible to the cloud 3 from any place via a mobile phone line, the user 9A can log into the cloud server 10 at the destination by operating the tablet 20.

The login to the cloud server 10 enables the user 9A to use not only a cloud print service but a variety of services provided on the cloud 3 by the cloud server 10. The logged-in user 9A refers to a list of MFPs registered for his/her user account. The MFPs registered in the list include an MFP registered for the guest account correlated with the user account. The list is displayed by the tablet 20 based on data transferred from the cloud server 10. The list usually includes the MFP 25 on the network 5. However, when the MFP 30 placed in the destination is not registered for the user account of the user 9A, the list does not include the MFP 30. If the user 9A gives up using the MFP 30 because the list does not include the MFP 30 at the destination (No in Step S202), then the user 9A logs out of the cloud server 10 and finishes the settings (Yes in Step S211).

If a guest account is registered for the MFP 30 (Yes in Step S203), and if the user 9A knows an account ID and a password for the guest account, even if the displayed list does not include the MFP 30 at the destination, the user 9A may use the MFP 30. In order to know the guest account, the user 9A may make an inquiry to the administrator of the MFP 30 via e-mail in advance, or, may be given a note when the user 9A arrives at the destination.

The case where the use of a guest account is necessary is a case where the guest account is not correlated with the user account of the user 9A (No in Step S204). In such a case, the user 9A enters an account ID and a password of the guest account as the evidence that the user 9A is an authentic guest (Step S205). The entry is deemed as a correlation request to the cloud server 10. The account management portion 112 receives the correlation request, and correlates the guest account with the user account of the user 9A in the account management table T11 (see FIG. 4). If the guest account is previously entered, and the guest account is already correlated with the user account of the user 9A (Yes in Step S204), then it is unnecessary to enter the guest account.

Upon the completion of correlation, a list showing MFPs registered for the user account of the user 9A is updated. To be specific, a list to which the MFP 30 registered for the guest account is added is displayed. The user 9A can check that he/she may use the MFP 30 by referring to the updated list.

The user 9A registers a job which is to be executed by the MFP 30 (Step S207). In the case of registering a print job, the user 9A designates a document in the cloud server 10 as a print target, and also designates printing conditions for items such as number of prints, N-in-1 printing, paper size, double-sided, and color. If necessary, the user 9A uploads a document to be printed to the cloud server 10. The user 9A can designate a job involving scanning, and designate operational conditions for items such as transmission destination, resolution, file format, and color.

In response to the job registration operation by the user 9A, the cloud server 10 determines whether or not it is possible to use each of the MFPs (including the MFP 30 correlated) registered for the user account of the user 9A. To be specific, the cloud server 10 determines whether or not a job designated by the user 9A satisfies constraints set for the user account of the user 9A corresponding to the MFP on which attention is focused as the determination target or constraints set for the guest account correlated with the user account. If the determination is positive, then the user 9A is permitted to use the focused MFP (Step S208). If the determination is negative for each of the MFPs, then an error message is displayed. In such a case, the user 9A changes job settings, or cancel the job.

If the job determined to satisfy the constraints is a pull print job or job involving scanning, the job is saved to the cloud server 10. On the other hand, if printing is to be performed in such a manner that the cloud server 10 sends a job to the MFP to request the same to perform printing, e.g., typical network printing in which a host sends a job to a printer (Yes in Step S209), then the user 9A designates the MFP 30 as a destination of the print job. By doing so, the print job is sent from the cloud server 10 to the MFP 30, and the MFP 30 performs printing.

In order to prevent the user 9A from designating the MFP 30 erroneously, the cloud server 10 causes the tablet 20 to display an image showing the shape of appearance or the color of the MFP 30, and a button for test printing. This makes it easy for the user 9A to designate the MFP 30 correctly even when the user 9A has never used the MFP 30 before. The user 9A can also give a command for test printing in order to predict the result of printing.

In the meantime, before the user 9A logs into the cloud server 10, in some cases, the user account is already registered for the MFP 30 in the MFP management table T30. Such a case is, for example, a case where the user 9A informs the administrator of the MFP 30 of the user account of the user 9A, and the administrator of the MFP 30 registers the user 9A as an authorized user for the MFP 30. In such a case (Yes in Step S206), the user 9A may use the MFP 30, even if the guest account is not registered in the MFP 30, or, even if the guest account is registered therein and the user 9A is not informed of the guest account.

Figure 13:
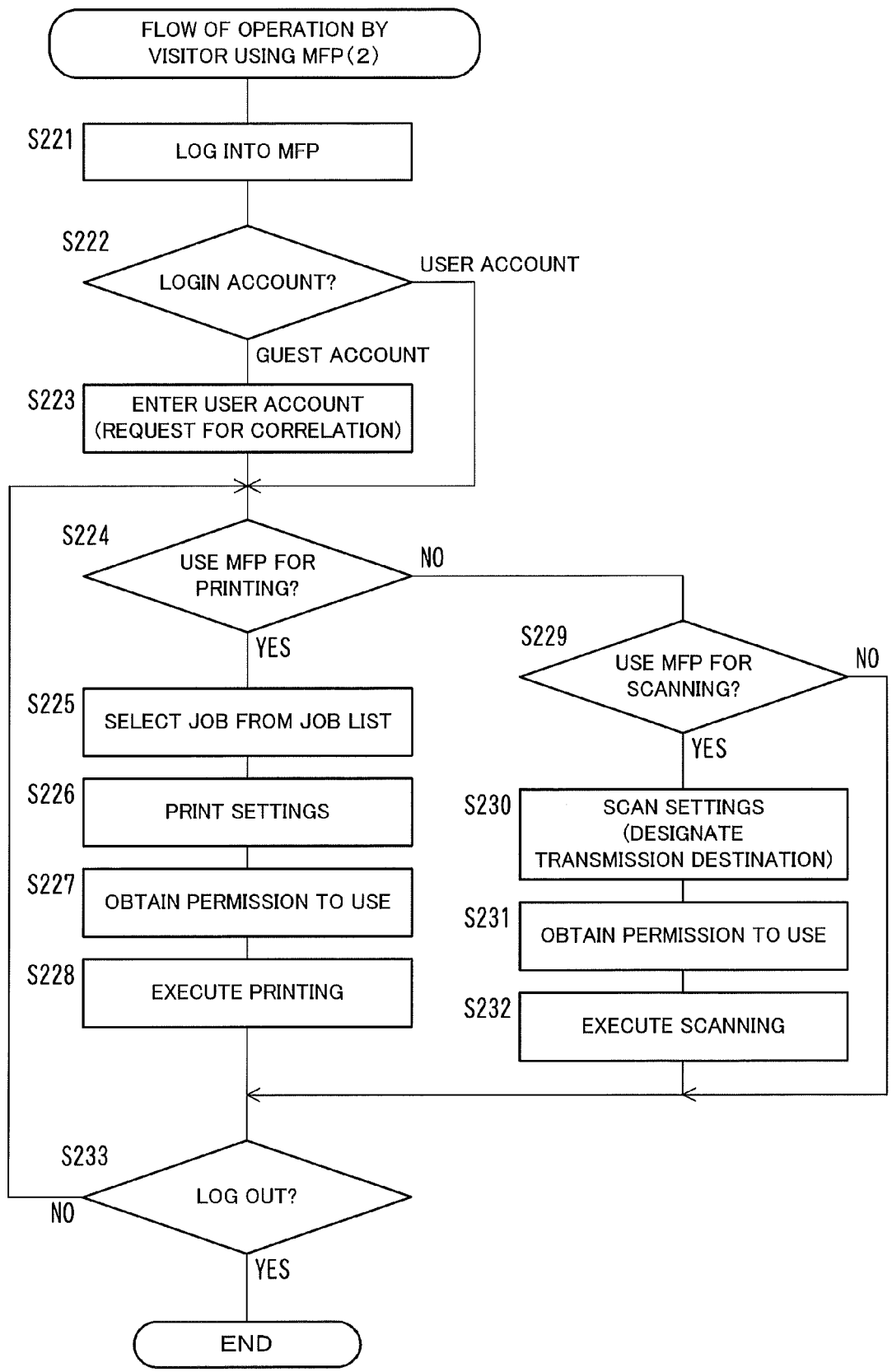
FIG. 13 is a flowchart depicting a second flow of operation performed by a visitor using an MFP.

FIG. 13 is a flowchart depicting a second flow of operation performed by a visitor who uses an MFP. Suppose that the user 9A shown in FIG. 1 operates the MFP 30 directly and intends to make the same execute a job.

The user 9A logs into the MFP 30 (Step S221). At this time, the user 9A may use his/her user account or a guest account informed to him/her in advance. If the user account is registered in the account management table T11, or alternatively, if the guest account is registered in the guest account management table T12, then the authentication portion 104 of the cloud server 10 approves the login.

If the user 9A logs into the MFP 30 with the guest account, then the user 9A enters the user name and the password of his/her user account (Step S223). The entry is deemed as a correlation request to the cloud server 10. The account management portion 112 receives the correlation request, and correlates the guest account with the user account of the user 9A in the account management table T11. Thereby, the cloud server 10 recognizes that the guest is the user 9A having the user account.

In order to use the MFP 30 for printing (Yes in Step S224), the user 9A selects a desired print job from among the job list displayed on the display 321 of the operating panel 32 (Step S225). The job list shows jobs that are saved in association with the user account of the user 9A in the cloud server 10. The job list may include jobs that are saved in storages other then the cloud server 10.

The user 9A makes print settings for changing printing conditions such as number of prints and scaling factor if necessary (Step S226), and receives permission to use from the cloud server 10 (Step S227). At this time, if the user 9A logs into the MFP 30 with the guest account, then the cloud server 10 applies constraints set for the guest account to determine whether or not the print job satisfies the constraints. If the user 9A logs into the MFP 30 with the user account, then the cloud server 10 applies constraints set for the user account to determine whether or not the print job satisfies the constraints. If it is determined that the print job satisfies the constraints, then the cloud server 10 permits the MFP 30 to execute the print job. Thereby, the use of the print function by the logged-in user 9A is permitted.

The user 9A operates a start key of the operating panel 32 to cause the MFP 30 to start printing (Step S228). After that, the user 9A logs out of the cloud server 10 to finish the settings (Step S233).

In order to use the scan function of the MFP 30 (Yes in Step S229), the user 9A places a document sheet on the ADF 33, and sets conditions for scan (Step S230). The user 9A operates the operating panel 32 to display a setting screen, and appropriately set conditions for items such as transmission destination (including the box 370), file format, and resolution on the setting screen. The user 9A makes settings so as to satisfy the constraints and receives permission to use the MFP 30 (Step S231). The user 9A then operates the start key to make the MFP 30 start scan operation (Step S232).

Figure 14:
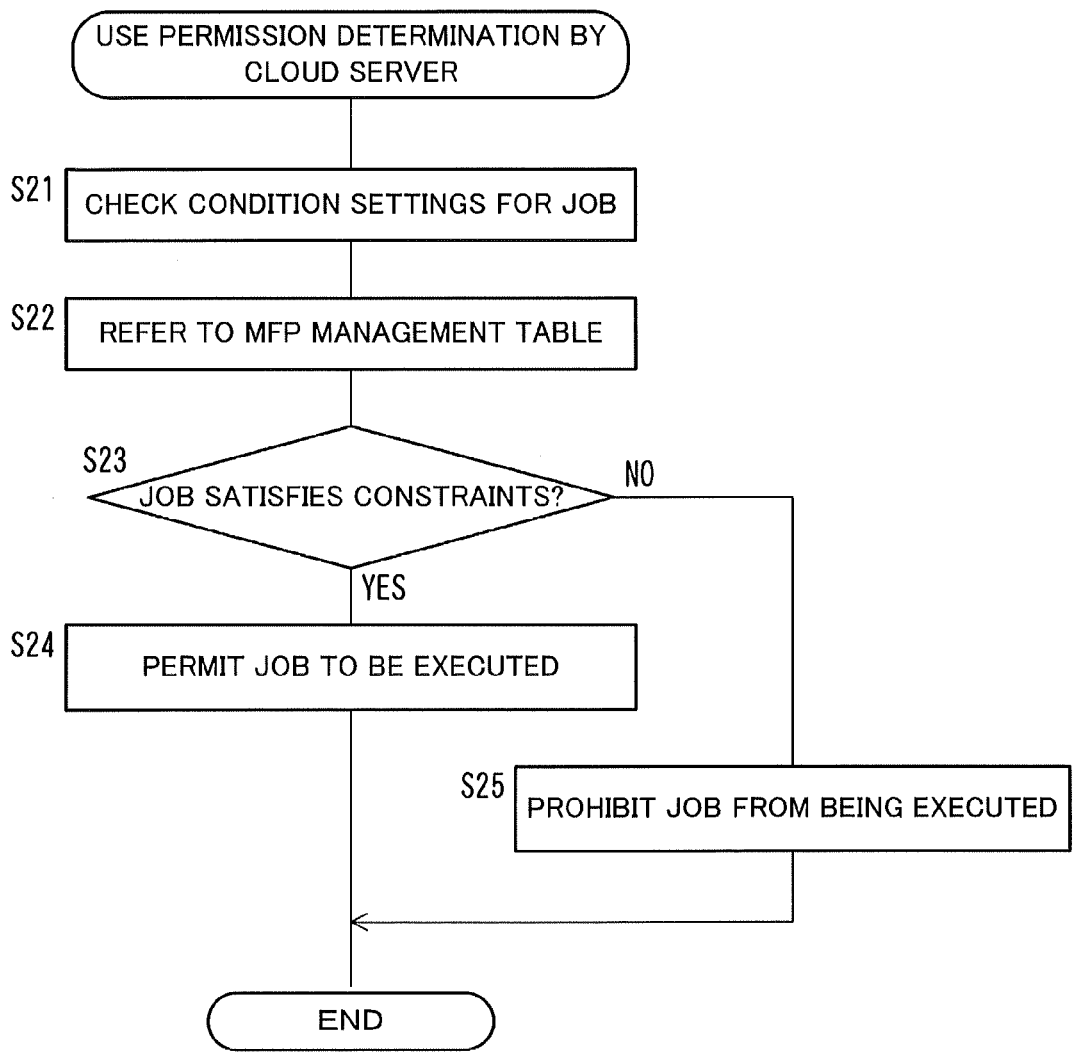
FIG. 14 is a flowchart depicting an example of the flow of use permission determination by a cloud server.

FIG. 14 is a flowchart depicting an example of the flow of use permission determination by the cloud server 10. The use restriction portion 108 of the cloud server 10 compares conditions set for a job corresponding to the logged-in user with the constraint conditions registered in the MFP management table T30, to determine whether or not the job satisfies the constraints (Steps S21, S22, and S23). If the determination is positive, then the use restriction portion 108 permits the job to be executed (Step S24). If the determination is negative, then the use restriction portion 108 prohibits the job from being executed (step S25).

Figure 15:
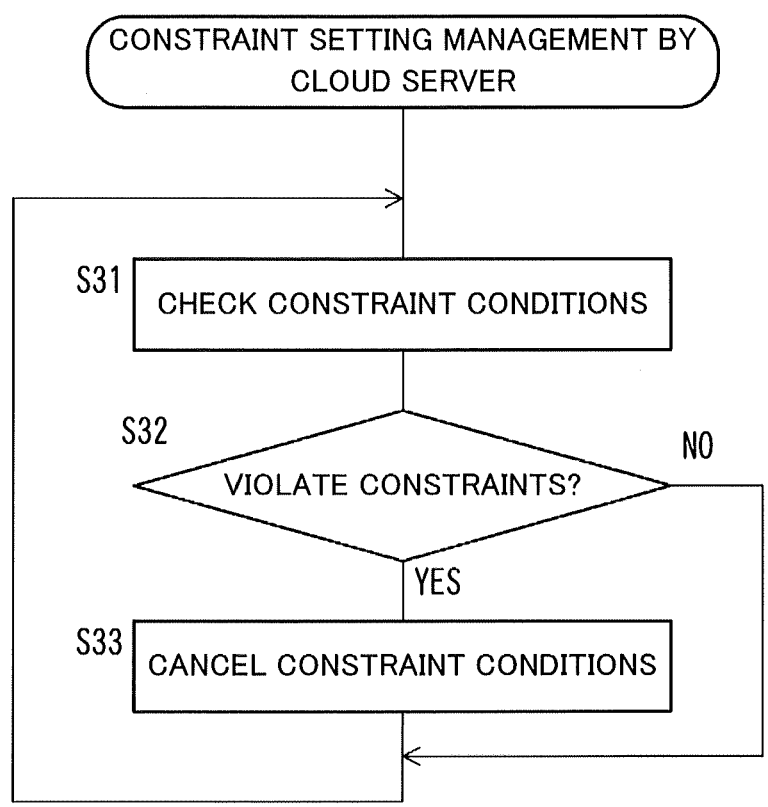
FIG. 15 is a flowchart depicting an example of the flow of constraint setting management by a cloud server.

FIG. 15 is a flowchart depicting an example of the flow of constraint setting management by the cloud server 10. The cloud server 10 has a function to automatically cancel settings for an authorized account which does not satisfy constraint conditions set for a valid period. The constraint setting portion 116 checks the constraint conditions registered in the MFP management table T30 at a preset time, and cancels constraint conditions which violate the preset rules (Steps S31, S32, and S33). At this time, if there is a guest account which passed the valid period, the cloud server 10 makes the guest account invalid. For example, the cloud server 10 deletes the guest account name of the guest account and the constraint conditions written in the MFP management table T30. The preset time at which the constraint conditions are checked may be a time at which the preset date and time is reached, a time at which login or other events occur, or another time.

In this embodiment, the following arrangement is possible: A user account of an ordinary user is distinguished from a user account of an MFP administrator, and only a user who has logged into the MFP with an administrator account is authorized to set a target MFP the use of which is restricted, an authorized user, and constraints in use for each authorized user.

According to this embodiment, it is possible to provide a cloud service which enables an information device on a network to which an account owner is not allowed to gain access to execute a job which meets constraints.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A cloud server for a cloud service, comprising:
a hardware processor configured to:
set an information device designated to a target device use of which is restricted;
set, as at least one authorized account with which login operation is allowed and with which use of the information device is allowed, either one or both of a guest account for the information device and any one of user accounts identifying users already registered in the cloud server depending on settings entered, and to set constraints in use of the information device for each authorized account;
permit a user who has logged into the cloud server with the authorized account to use the information device without exceeding constraints set for the authorized account; and
correlate, when a user who has logged into the cloud server with the user account not set for the authorized account enters the guest account, the user account with the guest account; wherein
the hardware processor permits the user who has logged into the cloud server with the user account not set for the authorized account to use the information device without exceeding constraints set for the quest account, provided that the quest account is correlated with the user account.

2. The cloud server according to claim 1, wherein, when a user who has logged into the cloud server with the guest account enters the user account not set for the authorized account, the hardware processor permits the information device to execute only a job satisfying constraints set for the guest account among jobs registered in advance for the user account entered.

3. The cloud server according to claim 1, wherein the hardware processor automatically cancels, with respect to an authorized account, of the authorized accounts, which does not satisfy conditions set for a valid period, settings in which the user account or the guest account is set at the authorized account.

4. A cloud print system including the cloud server according to claim 1, and a printer functioning as a designated information device and executing a job given from the cloud server, wherein
the hardware processor permits the user who has logged into the cloud server with the authorized account to enter a job into the printer without exceeding the constraints set for the authorized account.

5. The cloud server according to claim 1, wherein the guest account correlated with the user account is registered in the information device in advance.

6. The cloud server according to claim 1, wherein the information device is an image processing device.

7. The cloud server according to claim 1, wherein the information device is an image processing device.

8. A non-transitory computer-readable storage medium storing thereon a computer program executed in a cloud server for a cloud service, the computer program causing a computer included in the cloud server to perform processing comprising:
target setting processing of setting an information device designated to a target device use of which is restricted;
constraint setting processing of setting at least one authorized account with which login operation is allowed and with which use of the information device is allowed, and setting constraints in use of the information device for each authorized account, wherein either one or both of a guest account for the information device and any one of user accounts identifying users already registered in the cloud server is set as the authorized account depending on settings entered;
use restriction processing of permitting a user who has logged into the cloud server with the authorized account to use the information device without exceeding constraints set for the authorized account; and
account management processing of correlating, when a user who has logged into the cloud server with the user account not set for the authorized account enters the guest account, the user account with the guest account, wherein
the use restriction processing includes permitting the user who has logged into the cloud server with the user account not set for the authorized account to use the information device without exceeding constraints set for the guest account, provided that the guest account is correlated with the user account.

9. The non-transitory computer-readable storage medium according to claim 8, wherein, when a user who has logged into the cloud server with the guest account enters the user account not set for the authorized account, the computer program permits the information device to execute only a job satisfying constraints set for the guest account among jobs registered in advance for the user account entered.

10. The non-transitory computer-readable storage medium according to claim 8, wherein the constraint setting processing includes automatically canceling, with respect to an authorized account, of the authorized accounts, which does not satisfy conditions set for a valid period, settings in which the user account or the guest account is set at the authorized account.

11. The non-transitory computer-readable storage medium according to claim 8, wherein the guest account correlated with the user account is registered in the information device in advance.

12. A method for controlling use of an information device, the method comprising:
setting, by a cloud server, an information device designated to a target device use of which is restricted;
setting, by the cloud server, at least one authorized account with which login operation is allowed and with which use of the information device is allowed, and setting constraints in use of the information device for each authorized account, wherein either one or both of a guest account for the information device and any one of user accounts identifying users already registered in the cloud server is set as the authorized account depending on settings entered;
permitting, by the cloud server, a user who has logged into the cloud server with the authorized account to use the information device without exceeding constraints set for the authorized account, wherein the cloud server further correlates, when a user who has logged into the cloud server with the user account not set for the authorized account enters the guest account, the user account with the guest account, and the cloud server permits the user who has logged into the cloud server with the user account not set for the authorized account to use the information device without exceeding constraints set for the guest account, provided that the guest account is correlated with the user account.

13. The method according to claim 12, wherein, when a user who has logged into the cloud server with the guest account enters the user account not set for the authorized account, the cloud server permits the information device to execute only a job satisfying constraints set for the guest account among jobs registered in advance for the user account entered.

14. The method according to claim 12, wherein the cloud server automatically cancels, with respect to an authorized account, of the authorized accounts, which does not satisfy conditions set for a valid period, settings in which the user account or the guest account is set at the authorized account.

15. The method according to claim 12, wherein the guest account correlated with the user account is registered in the information device in advance.

16. The method according to claim 12, wherein the information device is an image processing device.

* * * * *